US010630213B2

(12) United States Patent
Maekawa et al.

(10) Patent No.: US 10,630,213 B2
(45) Date of Patent: Apr. 21, 2020

(54) MOTOR CONTROL INTEGRATED CIRCUIT

(71) Applicant: KABUSHIKI KAISHA TOSHIBA, Minato-ku (JP)

(72) Inventors: Sari Maekawa, Minato-ku (JP); Shinichi Kominato, Minato-ku (JP); Toshimitsu Aizawa, Minato-ku (JP); Naoki Oomura, Minato-ku (JP); Junichiro Hagura, Minato-ku (JP); Sadao Ikeda, Minato-ku (JP)

(73) Assignee: KABUSHIKI KAISHA TOSHIBA, Minato-Ku (JP)

( * ) Notice: Subject to any disclaimer, the term of this patent is extended or adjusted under 35 U.S.C. 154(b) by 0 days.

(21) Appl. No.: 16/134,089

(22) Filed: Sep. 18, 2018

(65) Prior Publication Data
US 2019/0089274 A1 Mar. 21, 2019

(30) Foreign Application Priority Data

Sep. 20, 2017 (JP) .................. 2017-180335

(51) Int. Cl.
H02P 6/08 (2016.01)
H02P 6/17 (2016.01)
(Continued)

(52) U.S. Cl.
CPC ............... H02P 6/085 (2013.01); H02P 6/10 (2013.01); H02P 6/17 (2016.02); H02P 6/18 (2013.01); H02P 25/022 (2013.01)

(58) Field of Classification Search
CPC ................... H02P 6/085; H02P 6/10
(Continued)

(56) References Cited

U.S. PATENT DOCUMENTS 6,555,988 B2 * 4/2003 Masaki .................. H02P 6/18
318/701
7,728,537 B2 * 6/2010 Tomigashi .............. H02P 21/06
318/400.02

(Continued)

FOREIGN PATENT DOCUMENTS

EP 0 462 050 A1 12/1991
JP 3454212 10/2003
JP 2015-126565 7/2015

OTHER PUBLICATIONS

German Office Action dated Jul. 1, 2019 in German Patent Application No. 10 2018 215 926.2 (with English translation), 12 pages.
(Continued)

Primary Examiner — David Luo
(74) Attorney, Agent, or Firm — Oblon, McClelland, Maier & Neustadt, L.L.P.

(57) ABSTRACT

A motor control integrated circuit according to embodiments outputs predetermined PWM signals to an inverter circuit that drives a synchronous motor and is configured to perform on-off control on a plurality of three-phase bridge connected switching elements in accordance with the PWM signals to convert direct current into three-phase alternating current, and includes: a PWM generation unit configured to generate the signals based on a received speed command value and output the PWM signals; and a current detection unit configured to detect differential values of phase currents at a predetermined time point that is fixed within a period of a carrier wave used for PWM control, based on the carrier wave and a signal generated by a current detector for detecting current conducted to the synchronous motor, wherein the PWM generation unit calculates a speed of the synchronous motor based on the differential values and then, based on the speed, generates the PWM signals to be applied to the synchronous motor.

7 Claims, 10 Drawing Sheets

(51) Int. Cl.
*H02P 6/10* (2006.01)
*H02P 6/18* (2016.01)
*H02P 25/022* (2016.01)

(58) Field of Classification Search
USPC .......................................... 318/700, 599, 560
See application file for complete search history.

(56) References Cited

U.S. PATENT DOCUMENTS 8,917,041 B2 * 12/2014 Kishimoto ................ H02P 6/16
318/400.14
2017/0201200 A1 7/2017 Hachiya et al.

OTHER PUBLICATIONS

Schroedl, M., "Sensorless Control of AC Machines at Low Speed and Standstill Based on the "INFORM" Method", IEEE, Industry Applications Conference Thirty-First IAS Annual Meeting, IAS'96. Conference Record, 1996, vol. 1, pp. 270-277.
Meivel, S., et al., "Sensorless Control of BLDC Motor Drive Using a Hysteres's Comparator and back emf technique", International Journal of Research and Engineering, vol. 2 No. 2, 2015, pp. 25-32.

* cited by examiner

MOTOR CONTROL INTEGRATED CIRCUIT

FIELD OF THE INVENTION

Embodiments of the present invention relate to a motor control integrated circuit for outputting PWM signals to an inverter circuit that is configured to drive a synchronous motor.

DESCRIPTION OF THE RELATED ART

As a method for estimating a rotational position of a synchronous motor, there is a widely used method including calculating induced voltage, which is proportional to a speed of the synchronous motor, from current and voltage that is input into the synchronous motor, and estimating the rotational position based on the induced voltage. There is proposed, for example, as discussed in Japanese Patent No. 3454212, a method for estimating the rotational position. In the method, use is made of the fact that an inductance varying in accordance with a saliency of a rotor contains information of the rotational position in a very low speed range where less information on the induced voltage is given. An AC signal for sensing, which is irrelevant to drive frequency, is applied to a permanent magnet synchronous motor, and the rotational position is estimated from a relation between voltage and current.

However, in sensorless control that uses the saliency as described above, it is necessary for the rotor to have a saliency being high to some extent. Usually, having a saliency ratio, which is a ratio between q-axis inductance Lq and d-axis inductance Ld, of about 1.5 is required. When the sensorless control is applied to a surface permanent magnet synchronous motor, what is called an SPMSM, or another type of motor that have a less saliency, a high-precision current detector and a high-precision AD converter are needed to detect minute current changes, which raises a cost of a controller.

In contrast, to perform sensorless driving simply, use is made of V/F control, or open-loop control such ac forced commutation and forced synchronous drive. In these control methods, a position command value is generated from a speed command value to a motor by integration operation or other kinds of operations, and a three-phase energization signal to the motor is generated based on the position command value.

Is vector control position sensors, three phase currents are converted into dq-axis currents based on a detected rotational position of a rotor, and a torque generated by conducting q-axis current rotates a motor, and the rotational position is detected by the position sensors. In contrast, in the forced commutation drive, three-phase current is converted to dg-axis current based on the position command value, and the current is fed based on a d-axis current command value or a voltage command value, for example, a duty command value or other command values.

FIG. 9 schematically illustrates a configuration of a controller configured to perform open-loop control. In the configuration, an actual load causes an angle error between a position command value and a rotational position of a motor. A true Iq current value to generate a torque is expressed by Formula (1) using a d-axis current command value $I_{dRef}$ based on an angle error $\Delta\theta$ and the position command value. A torque $T_M$ generated in a motor is expressed by Formula (2) from the true Iq current value. P denotes a pairs of poles, and $\varphi$ denotes a flux of a permanent magnet.

$$Iq = I_{dRef} \sin(\Delta\theta) \qquad (1)$$

$$T_M = P\varphi Iq \qquad (2)$$

In the forced commutation, a motor is driven based on a speed command value, and out-of-step therefore occurs when a load torque exceeds an output torque $T_M$ of a motor. A maximum torque that a motor can generate is determined by a magnitude of the d-axis current command value $I_{dRef}$ and the angle error $\Delta\theta$ given by Formula (1). From Formulae (1) and (2), the output torque $T_M$ monotonically increases when the angle error $\Delta\theta$ lies between 0 deg to 90 deg, and decreases when the angle error $\Delta\theta$ exceeds 90 deg. That is, 90 deg is a maximum angle error at which the driving can be performed stably. The magnitude of the d-axis current command value $I_{dRef}$ is therefore determined that the angle error $\Delta\theta$ does not exceed 90 deg even when a maximum torque is applied.

FIG. 10 illustrates operation waveforms of forced commutation drive at no load. The angle error $\Delta\theta$, which is a difference between a position command value $\theta_{Ref}$ and an actual rotational position $\theta$ of a motor, is substantially zero. FIG. 11 illustrates properties of a case when a load torque gradually increases. The angle error $\Delta\theta$ increases with an increase in the load torque, and a loss of synchronism occurs when the angle error $\Delta\theta$ exceeds its limit.

As seen from the above, in conventional forced commutation drive, a motor causes a loss of synchronism unless the d-axis current command value $I_{def}$ is determined in accordance with a conceivable maximum load, which therefore requires extra current when a load is light. In addition, a problem with the conventional forced commutation drive is that a loss of synchronism occurs when a load exceeding the conceivable maximum load is applied. When the loss of synchronism causes the motor to stop rotating, there is a risk that current conducted through a driving circuit such as an inverter flows to excess. It is therefore necessary to detect such a state to protect the circuit.

DETAILED DESCRIPTION OF THE EMBODIMENT

Hence, there is provided a motor control integrated circuit that can perform forced commutation control on a motor or detect a state of the motor stopping its rotation to protect a circuit.

The motor control integrated circuit according to embodiments for outputting predetermined PWM signals to an invert circuit that drives a synchronous motor and is configured to perform on-off control on a plurality of three-phase bridge connected switching elements in accordance with the PWM signals to convert direct current into three-phase alternating current, the motor control integrated circuit includes:

a PWM generation unit configured to generate the PWM signals based on a received speed command value and output the PWM signals; and a current detection unit configured to detect differential values of phase currents at a predetermined time point that is fixed within a period of a carrier wave used for PWM control, based on the carrier wave and a signal generated by a current detector for detecting current conducted to the synchronous motor, wherein the PWM generation unit calculates a speed of the synchronous motor based on the differential values and then, based on the speed, generates the PWM signals to be applied to the synchronous motor.

The motor control integrated circuit according to embodiments for outputting predetermined PWM signals to an inverter circuit that drives a synchronous motor and is configured to perform on-off control on a plurality of three-phase bridge connected switching elements in accordance with the PWM signals to convert direct current into three-phase alternating current, the motor control integrated circuit includes:

a PWM generation unit configured to generate the PWM signals based on a received speed command value and output the PWM signals; and a current detection unit configured to detect differential values of phase currents at a predetermined time point that is fixed within a period of a carrier wave used for PWM control, based on the carrier wave and a signal generated by a current detector for detecting current conducted to the synchronous motor; and a stop determination unit configured to generate a signal that represents a change in a rotational position of the synchronous motor based on the differential values and, based on the signal, determine whether the synchronous motor is in a stop state, wherein the generation unit stops output of the PWM signals when the stop determination unit determines that the synchronous motor is in the stop state.

First Embodiment

Figure 1:
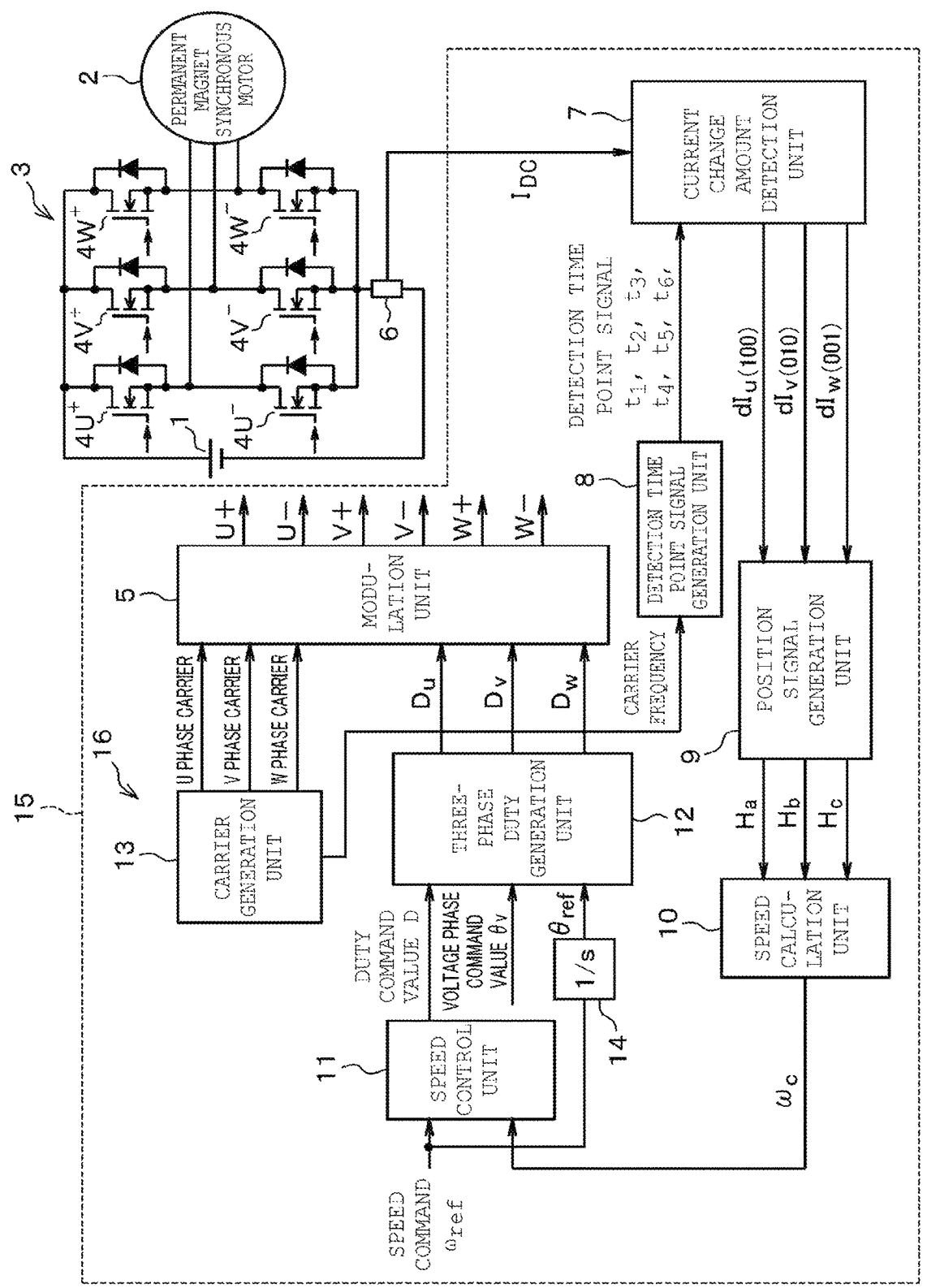
FIG. 1 is a diagram illustrating a system configuration for controlling an inverter circuit using a motor control IC to drive a motor in a first embodiment.

A first embodiment will be described below with reference to FIG. 1 to FIG. 7. FIG. 1 illustrates a configuration of a system that drives a motor by controlling an inverter circuit using a motor control IC (Integrated Circuit). A DC power supply 1 is a power source that drives a permanent magnet synchronous motor including a permanent magnet in its rotor (hereafter, simply referred to as a motor) 2. The DC power supply 1 may be one provided by converting an AC power supply into a DC power supply. An inverter circuit 3 includes six switching elements, for example, N channel MOSFETs 4U+, 4Y+, 4W+, 4U−, 4Y−, 4W−, the six switching elements being in three-phase bridge connection, and is configured to generate voltage for driving the motor 2 based on six switching signals for three phases that are generated in a modulation unit 5 to be described later.

A current detection unit 6 is connected between a negative-side power source line of the inverter circuit 3 and a negative-side terminal of the DC power supply 1. The current detection unit 6 is normally formed by a current sensor including a shunt resistance, a hall CT, or other kinds of elements, and a signal processing circuit and is configured to detect direct current Idc flowing in the motor 2. In the present embodiment, the current detection unit is described to have a configuration including a single shunt resistance but may have a three shunt configuration or a configuration in which current sensors are disposed in respective phase lines in the motor 2.

A current change amount detection unit 7 is configured to detect the direct current Idc six times based on detection time point signals t1 to t6 received from a detection time point signal generation unit 8 to be described later. Every two detections for the respective phases, a difference value between two detected values are calculated in a form of amounts of change dIu(100), dIv(010), and dIw(001). A position signal generation unit 9 is configured to generate signals that represent a rotational position of the rotor while the motor 2 is driven in a very low speed range. Using the amounts of change in currents of the phase received from the current change amount detection unit 7, the position signal generation unit 9 generates pulse signals Ha, Hb, and Hc that represent the rotational position. A speed calculation unit 10 is configured to calculate a speed estimation value ωc of the motor from the pulse signals Ha, Hb, and Hc generated by the position signal generation unit 9.

A speed control unit 11 is configured to use, for example, a PI controller to calculate a duty command value D from the speed command value $\omega_{Ref}$ given from a superordinate system and the speed estimation value ωc calculated by the speed calculation unit 10. A three-phase duty generation unit 12 is configured to calculate three-phase duties, namely three-phase modulation commands Du, Dv, and Dw from the duty command value D, a position command value $\theta_{Ref}$ obtained by integrating the speed command value $\omega_{Ref}$ using an integrator 14, and a voltage phase command value $\theta_V$, according to Formula (3).

$$Du = -D \sin(\theta_{Ref} + \theta_V) + 0.5$$

$$Dv = -D \sin(\theta_{Ref} + \theta_V - 2\pi/3) + 0.5$$

$$Dw = -D \sin(\theta_{Ref} + \theta_V + 2\pi/3) + 0.5 \quad (3)$$

The modulation unit 5 compares the three-phase modulation commands Du, Dv, and Dw with PWM carriers, namely carrier waves of the respective phases received from the carrier generation unit 13 to generate PWM signal pulses for the respective phases. The pulses for the respective phases are each given an added dead time, and switching signal U+, U−, V+, V−, W+, W− to be output to the N channel MOSFETs 4 of three phases up/down are generated.

Figure 2:
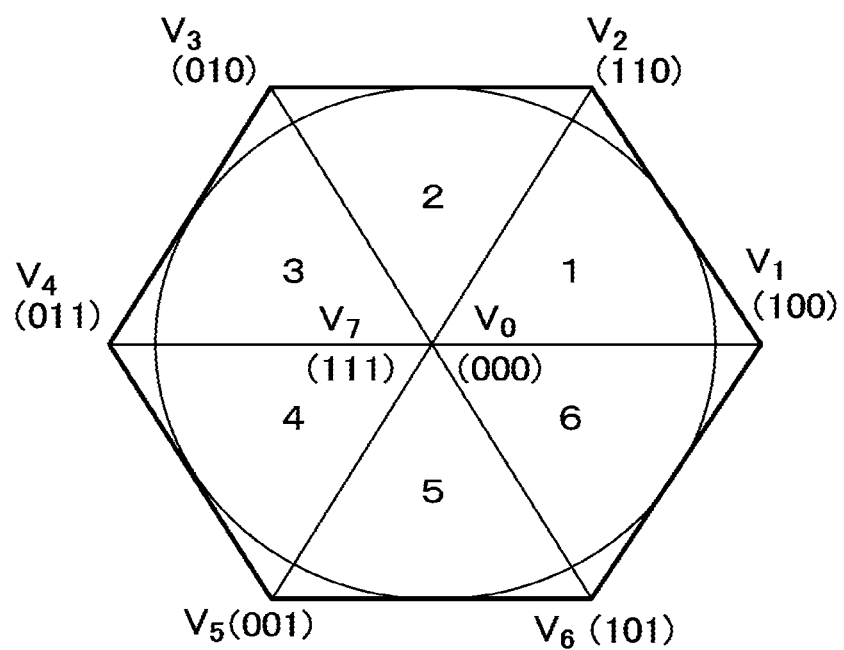
FIG. 2 is a diagram illustrating on-states of switching elements forming the inverter circuit, in a form of spatial vectors.
Figure 3:
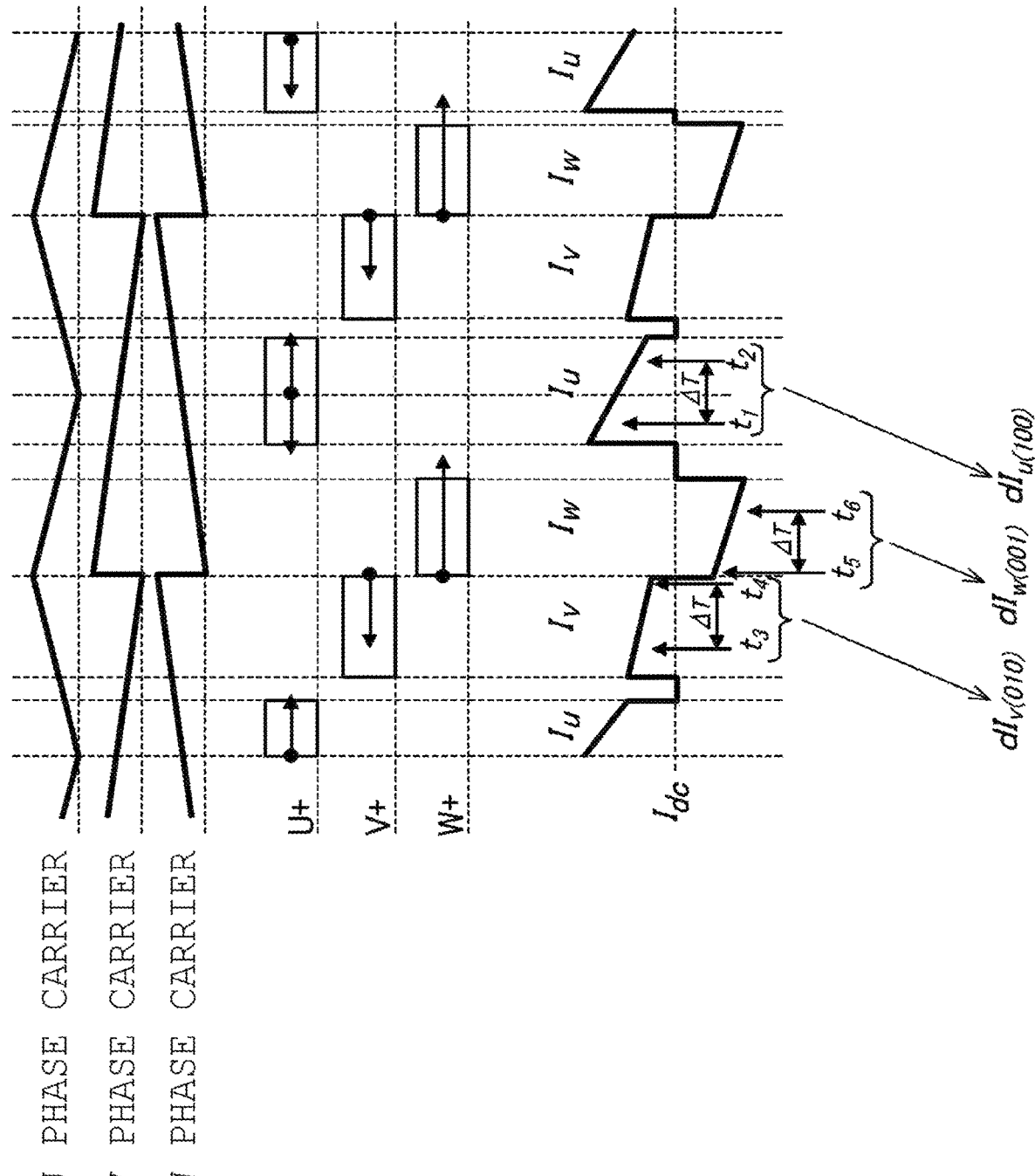
FIG. 3 is a graph illustrating PWM carriers and pulse signals of respective phases, and a current detection time points.

Here, as waveforms of the three carriers, use is made of, for example as illustrated in FIG. 3, a triangle wave, a sawtooth wave, and a reverse sawtooth wave, and in FIG. 3, the waveforms are the U phase: a triangle wave, the V phase: a reverse sawtooth wave, and the W phase: a sawtooth wave. Making a setting in such a manner causes periods during which the U phase is off, the V phase is on, and the W phase is off and periods during which the U phase is off, the V phase is off, and the W phase on to always come about in vicinities of crests of the triangle wave. Expressions of these cases in a form of spatial vectors illustrated in FIG. 2 are V3(010) and V5(001). In addition, the setting causes periods during which the U phase is on, the V phase is off, and the W phase is off to always come about in vicinities of troughs of the triangle wave. An expression of this case in a form of a spatial vector is V1(100). In such a manner, amounts of change in three-phase current dIv(010), dIw(001), and dIu (100) are detected in vicinities of the crests and roughs of the triangle wave, as illustrated in FIG. 3.

In the above-described configuration, all components excluding the DC power supply 1, the motor 2, the inverter circuit 3, and the current detection unit 6 are implemented in a form of a piece of hardware, a motor control IC 15. In the motor control IC 15, all components excluding the current change amount detection unit 7 form a PWM generation unit 16.

Next, description will be made about a principle of detecting a rotational position in very low speed driving according to the present embodiment. Formula (4) represents three-phase inductances of a permanent magnet synchronous motor having a saliency, where inductances Lu, Lv, and Lw of the respective phases change with changes in rotational position θ.

$$Lu = L_0 - L_1 \cos(2\theta)$$

$$Lv = L_0 - L_1 \cos\{2(\theta - 2\pi/3)\}$$

$$Lw = L_0 - L_1 \cos\{2(\theta + 2\pi/3)\} \quad (4)$$

Use of rotational position dependency of these inductances enables estimation of the rotational position even under a condition that a motor speed lies close to zero.

Here, the amount of change dIu(100), dIv(010), dIw(001) in the U phase, V phase, and W phase currents in a minute time period dt while voltage vectors V1(010), V3(010), V5(001) are applied are represented by signals that change with a phase difference of 120 degrees from each other with changes in rotational position θ, as expressed by Formulae (5) and (6).

$$dI_{u(100)} = \frac{dt}{A}\left(2 + \frac{L_1}{L_0}\cos(2\theta)\right) \quad (5)$$

$$dI_{v(010)} = \frac{dt}{A}\left(2 + \frac{L_1}{L_0}\cos\left(2\theta + \frac{2}{3}\pi\right)\right)$$

$$dI_{v(001)} = \frac{dt}{A}\left(2 + \frac{L_1}{L_0}\cos\left(2\theta - \frac{2}{3}\pi\right)\right)$$

$$\text{where } A = \frac{3L_0\left(1 - \left(\frac{L_1}{2L_0}\right)^2\right)}{V_{dc}} \quad (6)$$

Figure 4:
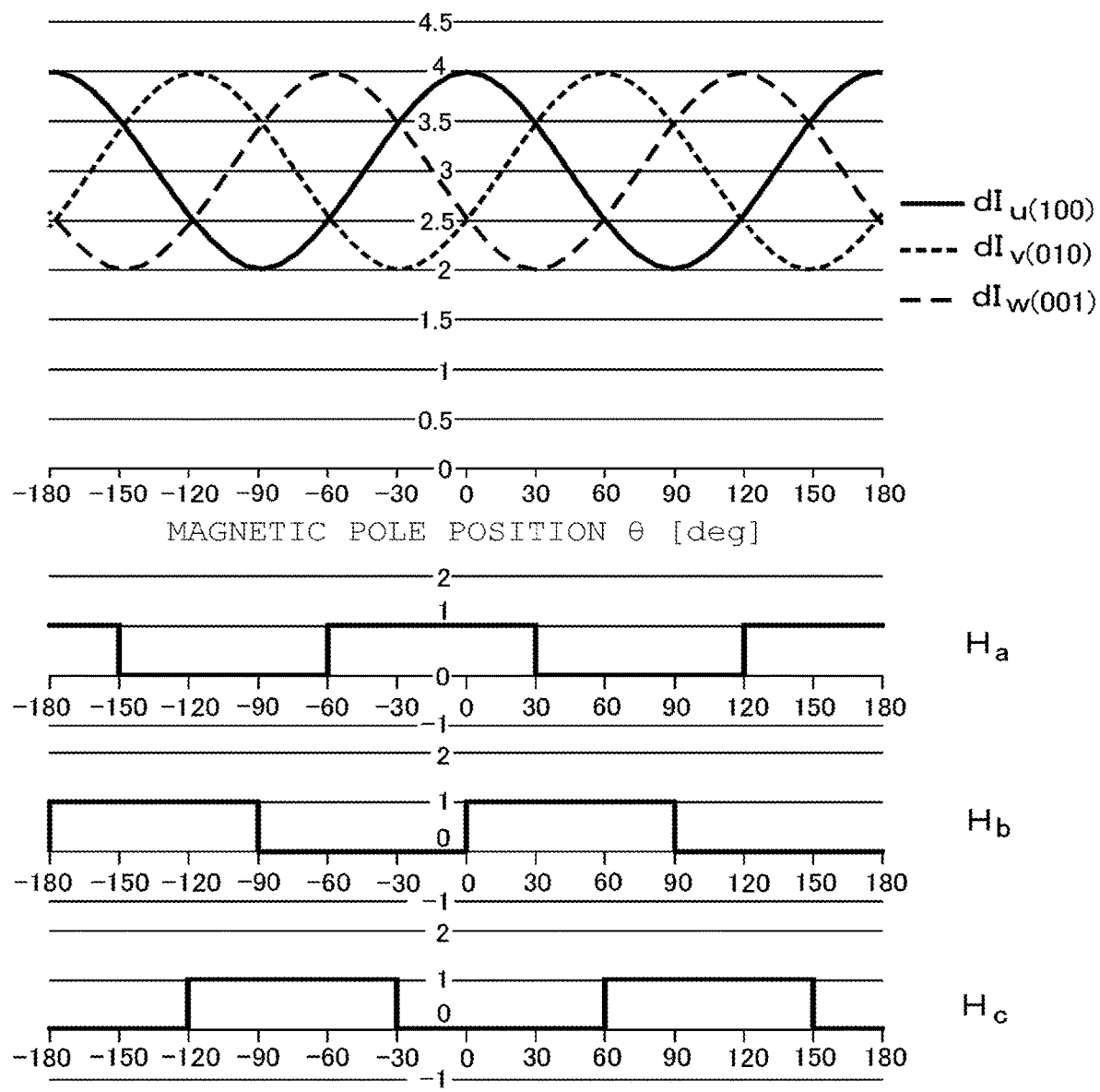
FIG. 4 is a graph illustrating amounts of change in current of respective phases and pulse signals Ha, Hb, and Hc.
Figure 5:
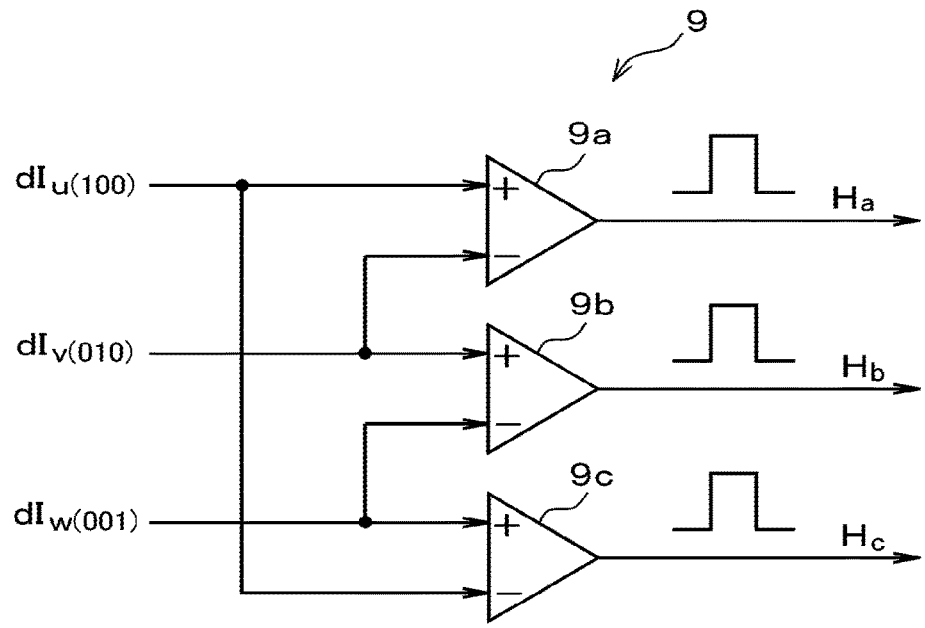
FIG. 5 is a diagram illustrating a configuration of a position signal generation unit.

By comparing magnitudes of these three signals, the pulse signals that represent the rotational position are generated. FIG. 4 illustrates the amounts of change in current dIu(100), dIv(010), and dIw(001) and the pulse signals Ha, Hb, and Hc generated from the comparison of the magnitudes. FIG. 5 illustrates a configuration example of a position signal generation unit 9. Three comparators 9a, 9b, and 9c are used to compare dIu(100) and dIv(010), dIv(010) and dIw(001), and dIw(001) and dIu(100), generating the pulse signals Ha, Hb, and Hc. The speed calculation unit 10 then uses a counter or other devices to measure on-periods of the pulse signals Ha, Hb, and Hc, obtaining the speed estimation value ωc of the motor 2.

Figure 6:
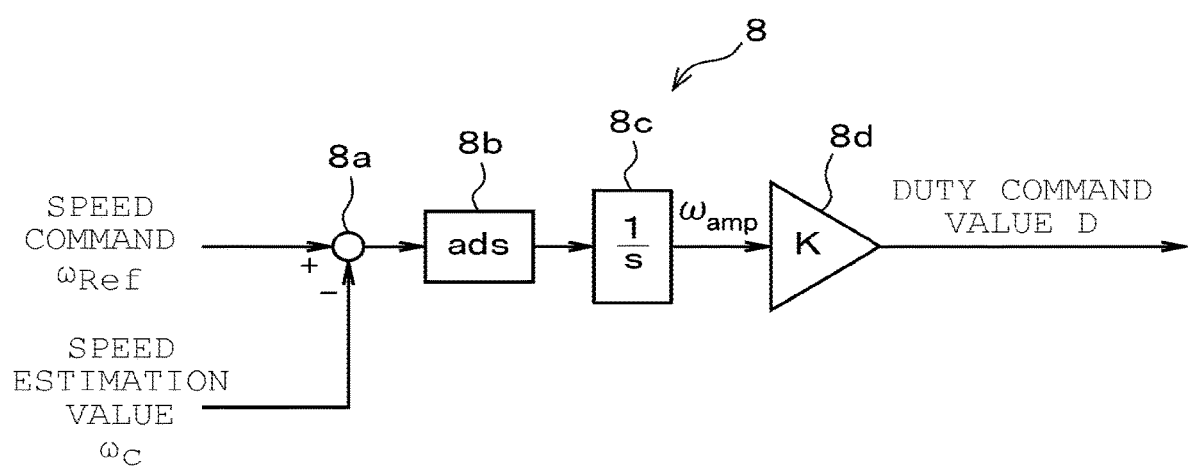
FIG. 6 is a diagram illustrating a configuration of a speed control unit.

The obtained speed estimation value ωc is input to the speed control unit 8, where the duty command value D is calculated. FIG. 6 illustrates a configuration of the speed control unit 8 in detail. A subtractor 8a subtracts the speed estimation value ωc from the speed command value $\omega_{Ref}$, and an absolute value of the subtraction is obtained by an abs operator 8b. The absolute value is integrated by an integrator 8c and multiplied by a gain K in an amplifier 8d, and the duty command value D is obtained.

In the conventional forced commutation drive, as described above, the current is controlled based on the d-axis current command value $I_{dRef}$ and the fixed duty command value. In contrast, the present embodiment operates such as to decrease the duty command value D when the detected speed estimation value ωc substantially follows the speed command value $\varphi_{Ref}$, which reduces current conducted in the motor 2 and the motor 2 operates with high efficiency.

Meanwhile, as described with reference to Formulae (1) and (2), a constant d-axis current causes the angle error Δθ to increase with an increase in a load, and when the angle error Δθ reaches close to 90 deg, the motor torque $T_M$ reduces, the speed decreases, and in addition, a loss of synchronism occurs. In such a case, conventional forced commutation cannot detect the decrease in the speed.

The configuration of the present embodiment operates such as to calculate an amount of variation in the estimation speed ωc calculated in the speed calculation unit 10 and increase the duty command value D in the speed control unit 8 when the amount of variation becomes large. As a result, the d-axis current command value $I_{dRef}$ in Formula (1) increases, and the drive control can be performed without causing a loss of synchronism. Calculation of an amount of variation $\omega_{amp}$ can be made performing, as shown in Formula (7), integration calculation on an absolute value of a difference value between the speed command value $\omega_{Ref}$ as a reference and the speed estimation value we by an electrical angle period, or averaging the integration calculation.

$$\omega_{amp} = \int_0^T \text{abs}(\omega_{Ref} - \omega_c)dt \quad (7)$$

In the configuration of the speed control unit 8 illustrated in FIG. 6, an output of the integrator 8c is the amount of variation $\omega_{amp}$.

In the speed control according to the present embodiment, a detected value of the rotational position is not used directly, and use is made only of the pulse signals Ha, Hb, and Hc based on the rotational position and the speed estimation value ωc calculated from the pulse signals. Therefore, in a case of driving, for example, a motor having a small saliency, such as an SPMSM, if a large error occurs in the detected amount of change in current dIu(100), dIv(010), and dIw(001), an error also occurs in the pulse signals Ha, Hb, and Hc generated based on the comparison of the magnitudes of the amounts and in the detected speed estimation value ωc.

However, a phase signal $\theta_{Ref}$ used in the three-phase duty generation unit 12 is determined by integrating the speed command value $\omega_{Ref}$ and the motor can be driven without being affected by a significant influence. An influence of the error on the speed estimation value ωc can be mitigated by using, for example, a low-pass filter or other filters. By lowering a bandwidth of the speed control, even an SPMSM can be driver at low speed.

Figure 7:
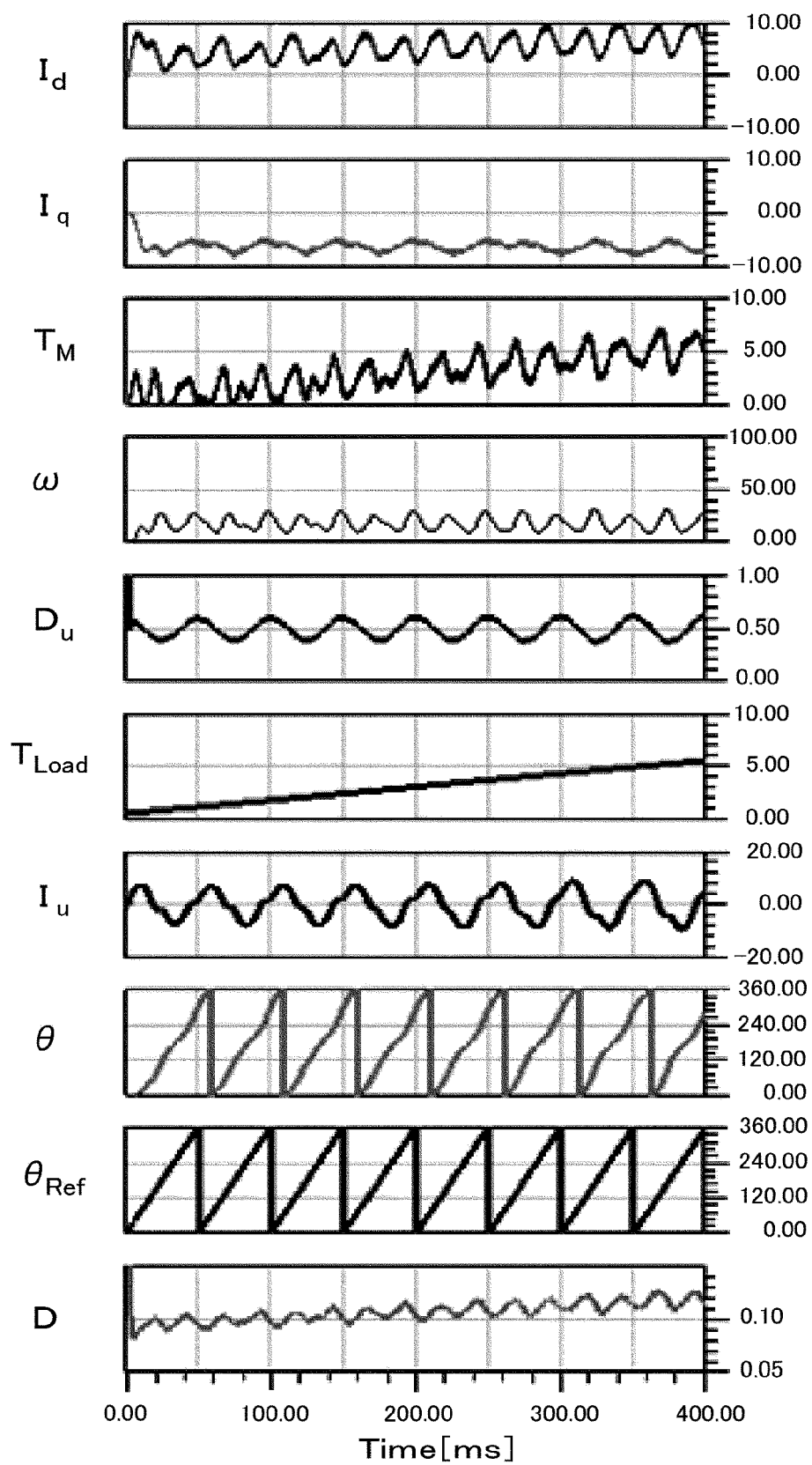
FIG. 7 is a graph illustrating properties of forced commutation control under a heavy load.
Figure 8:
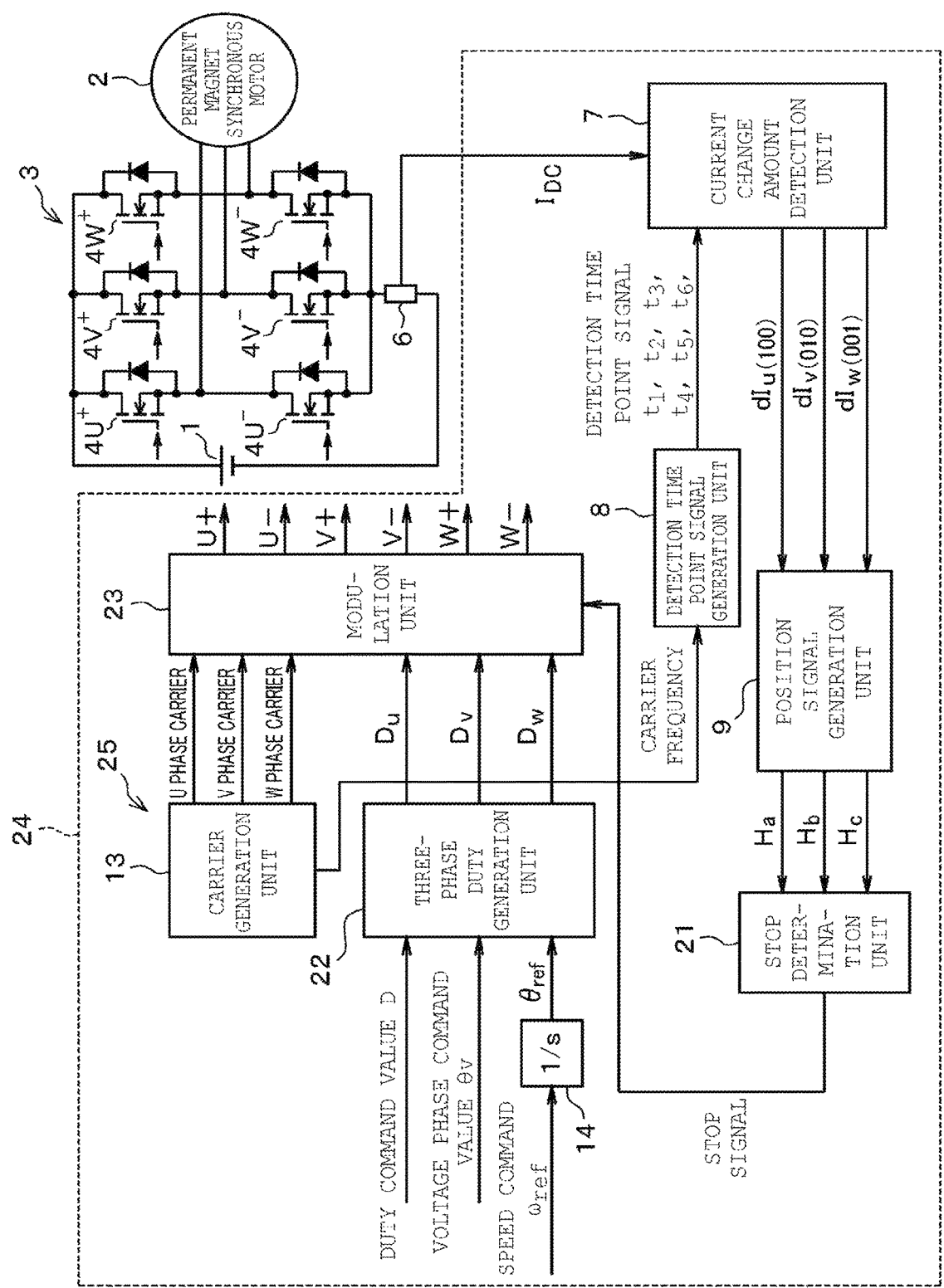
FIG. 8 is a diagram illustrating a system configuration for controlling an inverter circuit using a motor control IC to drive a motor in a second embodiment.
Figure 9:
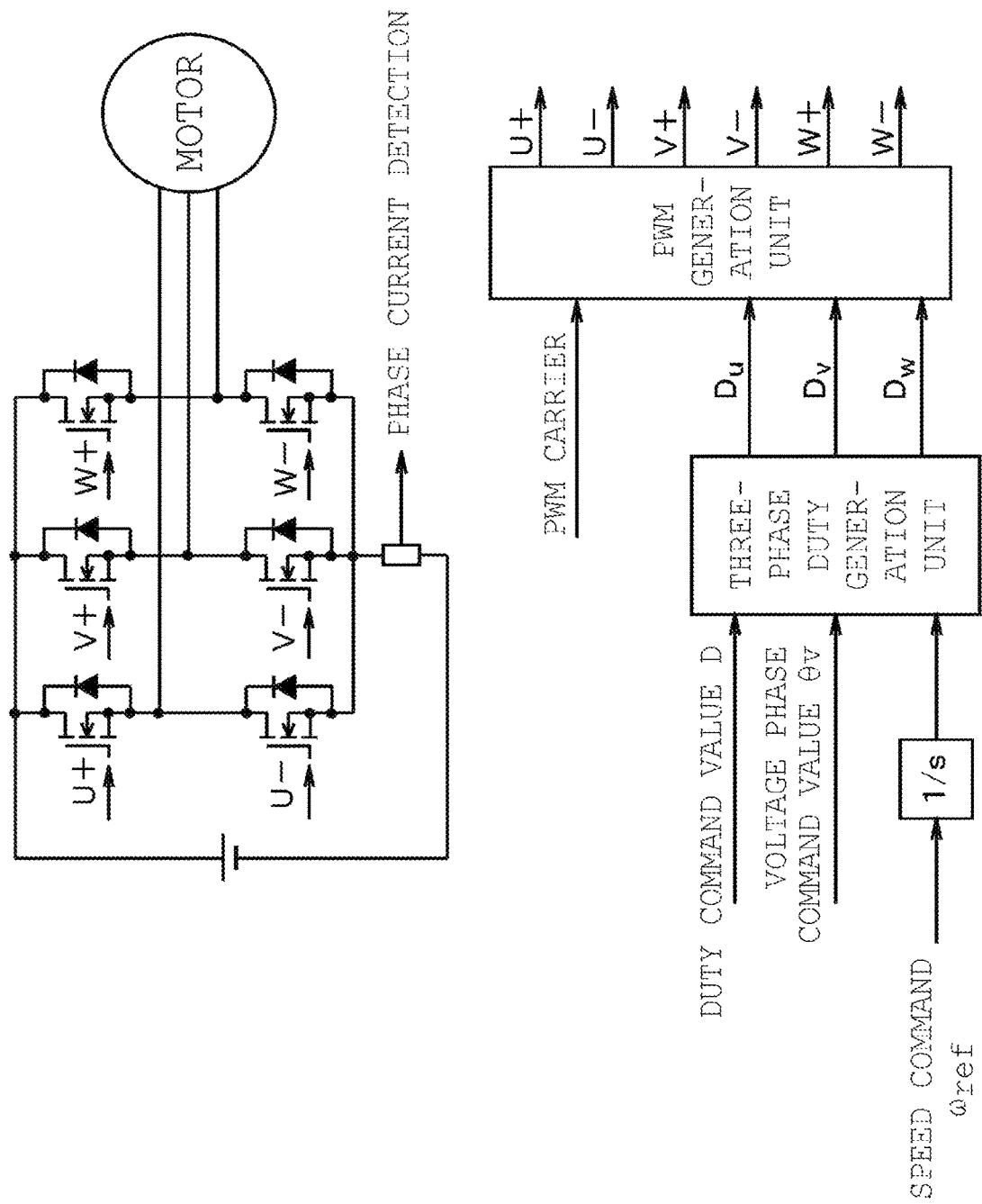
FIG. 9 is a diagram illustrating a configuration of a motor control device that performs conventional open-loop control.
Figure 10:
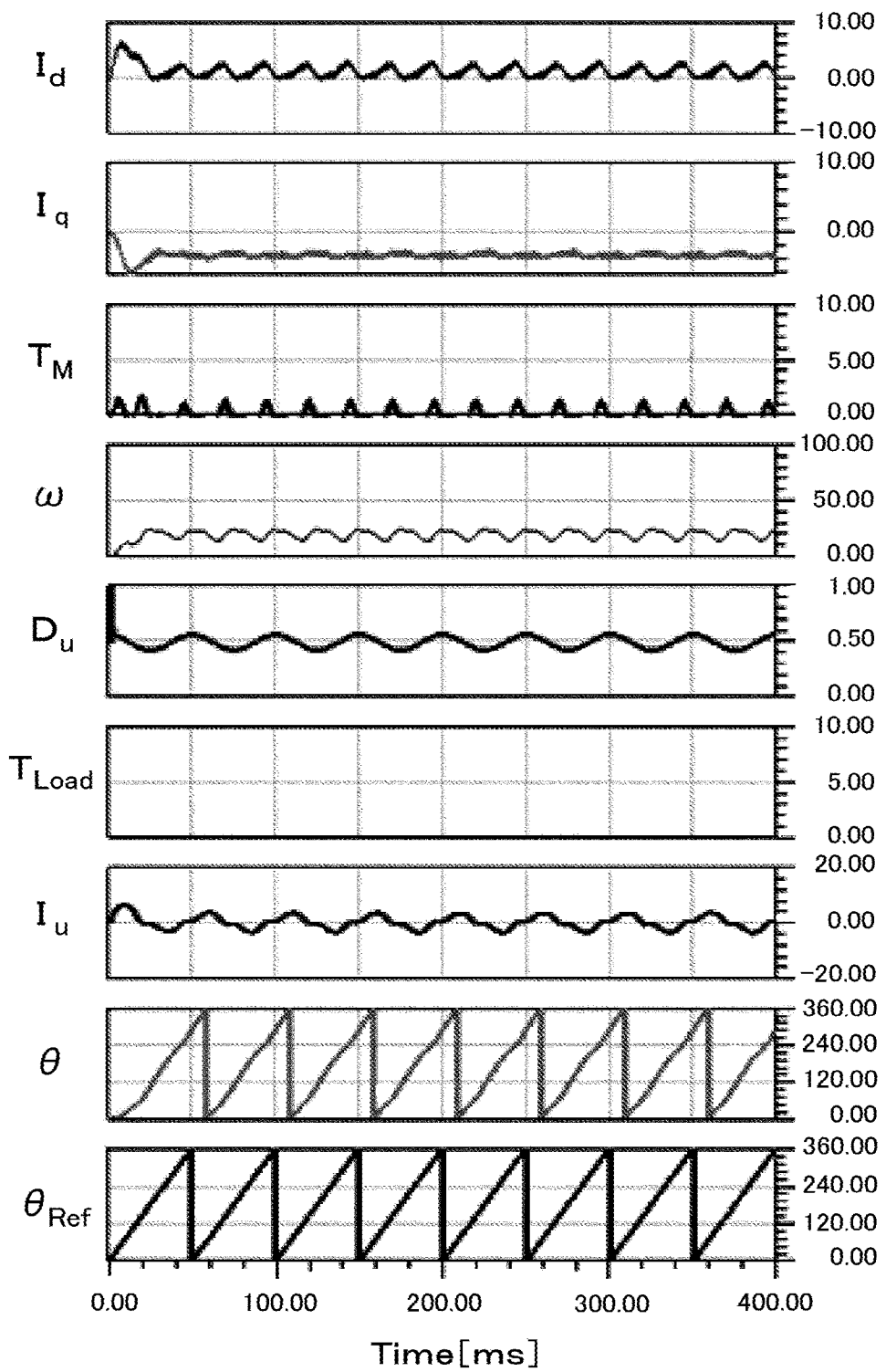
FIG. 10 is a graph illustrating operation waveforms of forced commutation drive under no load.
Figure 11:
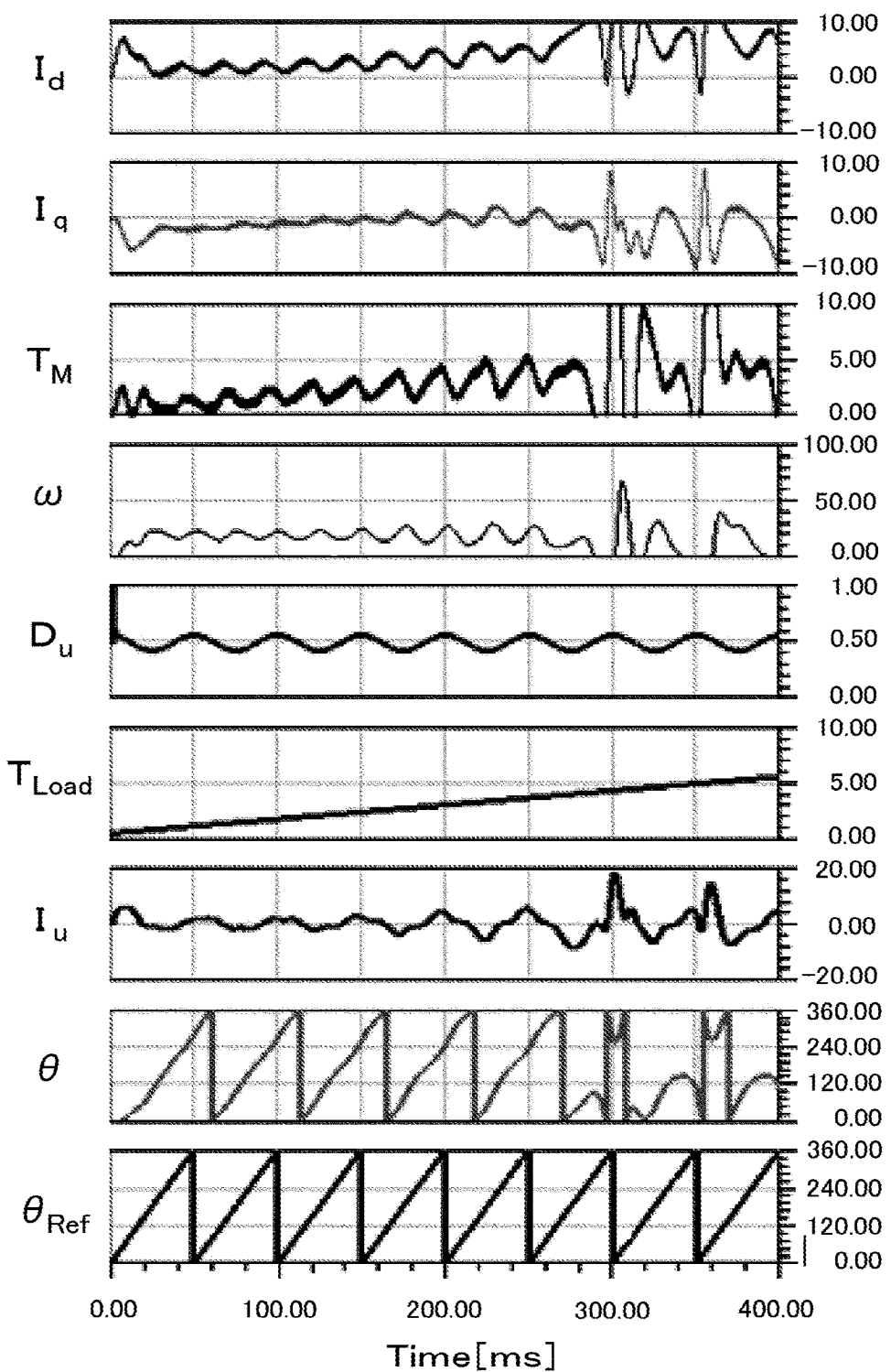
FIG. 11 is a graph illustrating operation waveforms of forced commutation drive under high load.

FIG. 7 illustrates properties of forced commutation control under a heavy load according to the present embodiment. The control is performed such that the duty command value D increases with an increase in a load. An amplitude of a U-phase duty Du increases, and as a result, the torque $T_M$ increases. The operation can be maintained without a loss of synchronism. Note that the increase in the amplitude of the U-phase duty Du is hard to recognize with this scale, and thus the duty command value D is illustrated with its vertical axis scaled up.

As seen from the above, according to the present embodiment, the motor control IC 15 is to drive the synchronous motor 2 and outputs the PWM signals to the inverter circuit 3. The PWM generation unit 16 generates and outputs the PWM signals based on the received speed command value $\omega_{Ref}$. The current change amount detection unit 7 detects differential values dIu(100), dIv(010), and dIw(001) of the phase currents based on the carriers used in the PWM control and the signal generated in the current detection unit 6 for detecting the current conducted in the motor 2, at a predetermined time point that is fixed within a carrier period. The PWM generation unit 16 calculates the speed $\omega c$ of the motor 2 based or the differential values and then, based on the speed $\omega c$, generates the PWM signals to be applied to the motor 2.

That is, the differential value of the phase currents each includes information on the rotational position of the motor 2. As a result, by performing the forced commutation drive on the motor 2 based on the speed command value $\omega_{Ref}$ and the speed $\omega c$ calculated based on the differential values, it is possible to perform the driving control with stability.

In addition, the PWM generation unit 16 includes the position signal generation unit 9 configured to generate the pulse signals Ha, Hb, and Hc changing with changes in a rotational position of the rotor of the motor 2 based on the comparison of the magnitudes of the differential values of the three phases. The speed calculation unit 10 calculates the speed $\omega c$ of the motor intervals at which levels of the pulse signals Ha, Hb, and Hc change. Accordingly, the speed $\omega c$ can be calculated with good responsiveness even when an actual speed of the motor 2 fluctuates.

The speed control unit 11 determines the duty command value D in accordance with the difference between the speed command value $\Omega_{Ref}$ and the calculated speed $\omega c$. The three-phase duty generation unit 12 determines the three-phase duty command values Du, Dv, and Dw based on the duty command value D, the position command value $\theta_{Ref}$ obtained by integrating the speed command value $\omega_{Ref}$, and the received voltage phase command value $\theta v$. It is therefore possible to perform phase control in the forced commutation drive using the voltage phase command value $\theta v$.

Second Embodiment

Hereafter, the same parts as in the first embodiment are denoted by the same reference characters, and the description of these similar parts will be eliminated. Only the different parts from the first embodiment will be described. In the first embodiment, the speed estimation value $\omega c$ is calculated from the pulse signals Ha, Hb, and Hc generated in the position signal generation unit 9. However, in a second embodiment, the pulse signals Ha, Hb, and Hc are input into a stop determination unit 21. The stop determination unit 21 is configured to measure high-level periods or low-level periods of the pulse signals Ha, Hb, and Hc using counters or other devices. When a measured period continues for a certain amount of time or longer, the stop determination unit 21 determines the motor 2 is in a stop state and outputs a stop signal.

The speed control unit 11 is eliminated, and a three-phase duty generation unit 22, substitution for the three-phase duty generation unit 12, is given a duty command value D input from the outside. A modulation unit 23, substitution for the modulation unit 5, is configured to stop output of the PWM signals upon receiving the stop signal. The motor control IC 24 is configured as above. In the motor control IC 24, all components excluding the current change amount detection unit 7, the position signal generation unit 9, and the determination unit 21 form a generation unit 25.

According to the second embodiment configured as above, when the motor 2 comes in an overload state to stop by application of a load torque larger than its output torque $T_M$, the stop determination unit 21 detects the stop state, and the modulation unit 23 stops energization. It is therefore possible to protect the motor 2 from an excessive energization state.

Other Embodiments

To generate the PWM signals of the three phases as in the embodiments, use need not be made of three different carriers. Use may be made of a phase shift function or other functions, or a method that changes a duty setting time point of one carrier, or changes polarities to be compared or the like in the generation of the pulses.

The time point used by the current change amount detection unit for detecting the currents of the three phases within the carrier period is not necessarily with respect to a phase at which a level of a carrier reaches its minimum or maximum, and may be set based on any phase of the carrier within a range in which the currents of the three phases can be detected.

The time point for detecting the currents need not be matched with the cycle of the PWM carrier, and the detection may be performed, for example, with a cycle two or four times the carrier period. Therefore, the current detection time point signal input into the current change amount detection unit need not be the signal itself obtained from the carrier and may be a signal generated by a separated timer.

The pulse signals are not necessarily Ha, Hb, and Hc, and one or two of them may be used to determine the speed $\omega c$.

The voltage vectors used to measure the amount of change in current are not limited to V1, V3, and V5 described above. That is, the differential values of the phase currents used for the control are not limited to dIu(100), dIv(010), dIw(001). Differential values having a phase difference of 60 degrees from each other may be selected as appropriate.

The current detection unit may include either of a shunt resistance or a CT. As the switching elements, use may be made of MOSFETs, IGETs, power transistors, or wide-bandgap semiconductors such as SiC and GaN.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. These embodiments and modifications thereof are included in the scope and the gist of the invention and included in the inventions described in claims and a scope of equivalents of the inventions.

We claim:

1. A motor control integrated circuit for outputting predetermined PWM signals to an inverter circuit that drives a synchronous motor and is configured to perform on-off control on a plurality of three-phase bridge connected switching elements in accordance with the PWM signals to convert direct current into three-phase alternating current, the motor control integrated circuit comprising:
   a PWM generation unit configured to generate the PWM signals based on a received speed command value and output the PWM signals;
   a current detection unit configured to detect differential values of phase currents at a predetermined time point that is fixed within a period of a carrier wave used for PWM control, based on the carrier wave and a signal generated by a current detector for detecting current conducted to the synchronous motor; and
   a stop determination unit configured to generate a signal that represents a change in a rotational position of the synchronous motor based on the differential values and, based on the signal, determine whether the synchronous motor is in a stop state, wherein
   the PWM generation unit stops output of the PWM signals when the stop determination unit determines that the synchronous motor is in the stop state.

2. The motor control integrated circuit according to claim 1, comprising
   a position signal generation unit configured to generate pulse signals that change with changes in a rotational position of a rotor of the synchronous motor, based on comparison of magnitudes of the differential values of three phases, wherein
   the stop determination unit determines the stop state of the synchronous motor from intervals at which the levels of the pulse signals change.

3. The motor control integrated circuit according to claim 2, wherein the PWM generation unit includes a three-phase duty generation unit configured to determine three-phase duty command values based on a position command value obtained by integrating the speed command value, a received duty command value, and a received voltage phase command value.

4. The motor control integrated circuit according to claim 1, wherein the PWM generation unit includes a three-phase duty generation unit configured to determine three-phase duty command values based on a position command value obtained by integrating the speed command value, a received duty command value, and a received voltage phase command value.

5. A motor control integrated circuit for outputting predetermined PWM signals to an inverter circuit that drives a synchronous motor and is configured to perform on-off control on a plurality of three-phase bridge connected switching elements in accordance with the PWM signals to convert direct current into three-phase alternating current, the motor control integrated circuit comprising:
   a PWM generation unit configured to generate the PWM signals based on a received speed command value and output the PWM signals; and
   a current detection unit configured to detect differential values of phase currents at a predetermined time point that is fixed within a period of a carrier wave used for PWM control, based on the carrier wave and a signal generated by a current detector for detecting current conducted to the synchronous motor,
   wherein the PWM generation unit calculates a speed of the synchronous motor based on the differential values and then, based on the speed, generates the PWM signals to be applied to the synchronous motor, and
   wherein the PWM generation unit includes:
      a position signal generation unit configured to generate pulse signals that change with changes in a rotational position of a rotor of the synchronous motor, based on comparison of magnitudes of the differential values of three phases, and
      a speed calculation unit configured to calculate a speed of the synchronous motor from intervals at which levels of the pulse signals change.

6. The motor control integrated circuit according to claim 5, wherein the PWM generation unit includes:
   a speed control unit configured to determine a duty command value in accordance with a difference between the speed command value and the calculated speed of the synchronous motor; and
   a three-phase duty generation unit configured to determine three-phase duty command values based on the duty command value, a position command value obtained by integrating the speed command value, and a received voltage phase command value.

7. A motor control integrated circuit for outputting predetermined PWM signals to an inverter circuit that drives a synchronous motor and is configured to perform on-off control on a plurality of three-phase bridge connected switching elements in accordance with the PWM signals to convert direct current into three-phase alternating current, the motor control integrated circuit comprising:
   a PWM generation unit configured to generate the PWM signals based on a received speed command value and output the PWM signals; and
   a current detection unit configured to detect differential values of phase currents at a predetermined time point that is fixed within a period of a carrier wave used for PWM control, based on the carrier wave and a signal generated by a current detector for detecting current conducted to the synchronous motor,
   wherein the PWM generation unit calculates a speed of the synchronous motor based on the differential values and then, based on the speed, generates the PWM signals to be applied to the synchronous motor, and
   wherein the PWM generation unit includes:
      a speed control unit configured to determine a duty command value in accordance with a difference between the speed command value and the calculated speed of the synchronous motor, and
      a three-phase duty generation unit configured to determine three-phase duty command values based on the duty command value, a position command value obtained by integrating the speed command value, and a received voltage phase command value.

* * * * *